US008328290B2

(12) United States Patent
Malatesta et al.

(10) Patent No.: US 8,328,290 B2
(45) Date of Patent: Dec. 11, 2012

(54) EXPANDED SIZE SLUDGE VACUUM TANKER

(75) Inventors: Michael T. Malatesta, Brookfield, WI (US); Jeff R. Dean, Hartford, WI (US); Patrick G. Wheaton, Germantown, WI (US); Jason P. Derby, Racine, WI (US)

(73) Assignee: Advanced Waste Services, Inc., West Allis, WI (US)

( * ) Notice: Subject to any disclaimer, the term of this patent is extended or adjusted under 35 U.S.C. 154(b) by 155 days.

(21) Appl. No.: 12/851,356

(22) Filed: Aug. 5, 2010

(65) Prior Publication Data

US 2011/0031801 A1  Feb. 10, 2011

Related U.S. Application Data

(60) Provisional application No. 61/231,912, filed on Aug. 6, 2009.

(51) Int. Cl.
*B65G 67/30* (2006.01)

(52) U.S. Cl. ...................................... 298/17 R
(58) Field of Classification Search .......... 298/17 R; 137/351, 615, 899; 15/352; 220/263
See application file for complete search history.

(56) References Cited

U.S. PATENT DOCUMENTS

| | | | |
|---|---|---|---|
| 2,184,384 A * | 12/1939 | Gregoric | 406/42 |
| 3,087,187 A | 4/1963 | Hank et al. | |
| 3,181,914 A | 5/1965 | Humes | |
| 4,033,625 A | 7/1977 | Fikse | |
| 4,095,398 A | 6/1978 | Aumann et al. | |
| 4,227,893 A * | 10/1980 | Shaddock | 95/268 |
| 4,286,797 A | 9/1981 | Mekosh, Jr. et al. | |
| 4,578,840 A | 4/1986 | Pausch | |
| 4,580,805 A | 4/1986 | Bertolini | |
| 4,660,843 A | 4/1987 | Hicks | |
| 4,725,186 A * | 2/1988 | Jerue | 414/627 |
| 4,865,341 A | 9/1989 | Hicks | |
| 4,877,293 A * | 10/1989 | French et al. | 298/17 R |
| 4,948,155 A | 8/1990 | Smith et al. | |
| 4,958,845 A | 9/1990 | Parks | |
| 5,030,259 A | 7/1991 | Bryant et al. | |
| 5,062,868 A | 11/1991 | Kennedy | |
| 5,183,086 A | 2/1993 | Fanta et al. | |
| 5,183,371 A | 2/1993 | O'Daniel | |
| 5,195,852 A * | 3/1993 | Malugani et al. | 406/153 |

(Continued)

FOREIGN PATENT DOCUMENTS

CA  2239628 A1 * 12/1999

(Continued)

*Primary Examiner* — H Gutman
(74) *Attorney, Agent, or Firm* — Reinhart Boerner Van Deuren s.c.

(57) ABSTRACT

An extendable mobile fluid carrying apparatus including a first frame configured to couple to a tractor. A fluid container is coupled to the first frame and configured to rotate about a pivot device of the first frame. The container defines a closable orifice configured to decant a fluid from the container. A high-CFM blower is coupled to the container and configured to draw a vacuum. A lift mechanism is coupled to the first frame and the fluid container and configured to lift the fluid container to an angle greater than 45° relative to the first frame. A second frame is slidingly coupled to the first frame, with the second frame configured to extend away from the first frame a predetermined distance. The second frame includes a wheel set. The tractor may include a power takeoff mechanism coupled to a prime mover and to the blower.

19 Claims, 10 Drawing Sheets

U.S. PATENT DOCUMENTS

| | | | |
|---|---|---|---|
| 5,268,010 A | 12/1993 | Zengerer | |
| 5,564,408 A * | 10/1996 | Bassols | 125/12 |
| 5,596,788 A * | 1/1997 | Linville et al. | 15/352 |
| 5,630,625 A | 5/1997 | Shaw | |
| 5,755,264 A | 5/1998 | Richards et al. | |
| 5,782,538 A | 7/1998 | Backs | |
| 5,946,767 A | 9/1999 | Sinz | |
| 6,013,138 A | 1/2000 | Sinz | |
| 6,149,345 A * | 11/2000 | Atkins | 405/128.2 |
| 6,663,185 B1 | 12/2003 | Richards | |
| 6,854,789 B2 * | 2/2005 | Kloepfer | 296/183.2 |
| 7,214,028 B2 | 5/2007 | Boasso et al. | |
| 7,323,022 B1 * | 1/2008 | Redlin | 55/319 |
| 7,426,769 B2 * | 9/2008 | Mensch | 15/340.1 |
| 7,451,521 B2 * | 11/2008 | Cappellotto | 15/340.1 |
| 7,676,965 B1 * | 3/2010 | Nathenson et al. | 37/317 |
| 7,712,481 B1 * | 5/2010 | Mayer et al. | 137/351 |
| 8,060,978 B2 * | 11/2011 | Young et al. | 15/340.1 |
| 8,066,140 B1 * | 11/2011 | Young et al. | 220/263 |
| 2006/0179603 A1 | 8/2006 | Polston | |
| 2011/0103901 A1 * | 5/2011 | Hetcher et al. | 406/39 |

FOREIGN PATENT DOCUMENTS

| | | |
|---|---|---|
| JP | 1014442 | 1/1989 |

\* cited by examiner

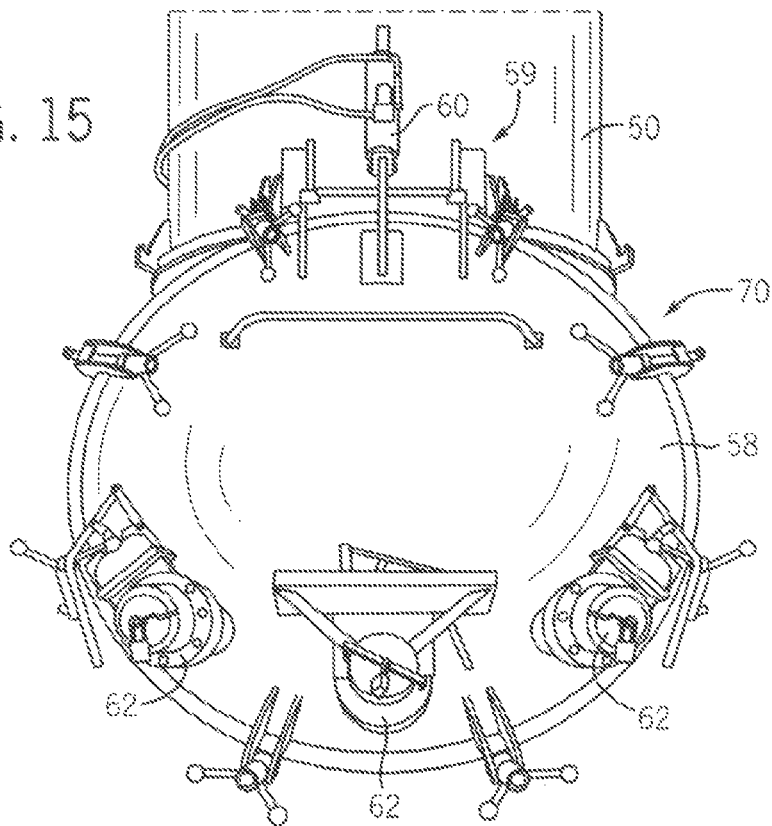
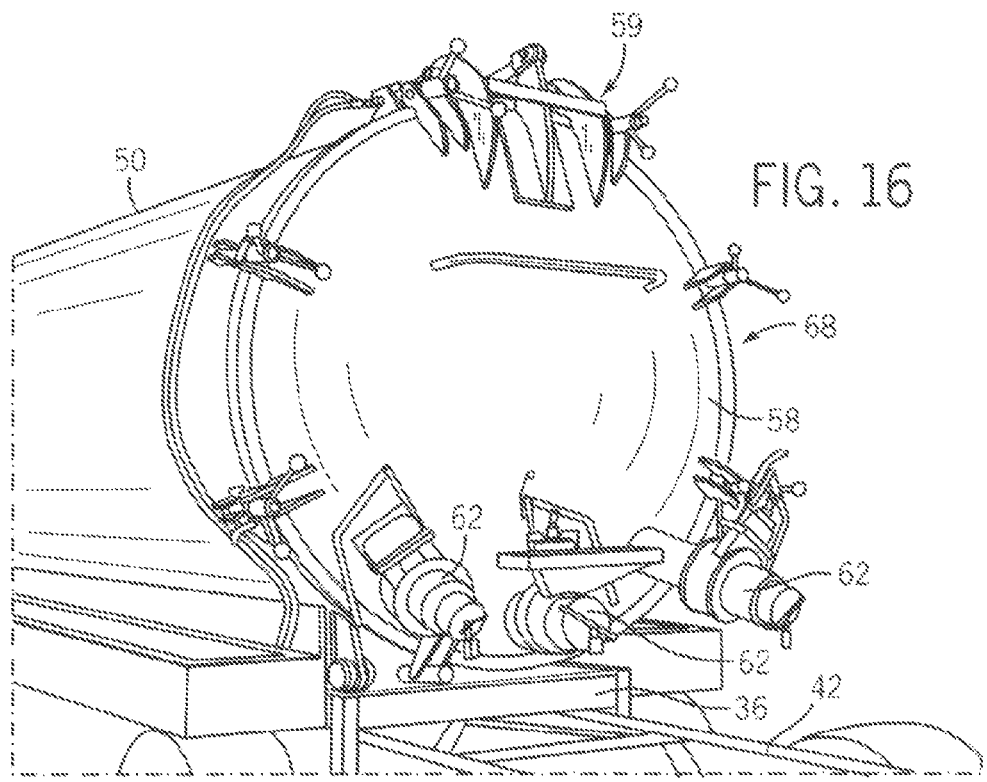

EXPANDED SIZE SLUDGE VACUUM TANKER

CROSS-REFERENCE TO RELATED APPLICATION

This Application claims the benefit of U.S. Provisional Application No. 61/231,912, filed Aug. 6, 2009, all of which is incorporated herein by this reference.

BACKGROUND OF THE INVENTION

Field of the Invention

This invention relates to fluid transporting vehicles, and more particularly, to tanker vehicles figured to transport liquids including liquid sludge.

Liquid transporting vehicles such as tank trucks are previously known and such tank trucks typically are hinged at the back end with the front end of the tank being driven upward by a hydraulic cylinder to tip the front end of the tank up to decant the contents of the tank. Fluids typically are drawn into the tank by a vacuum apparatus. Because of bridge and road limits, such tank trucks typically are limited to a maximum capacity of 2,500 gallons at 10 pounds per gall on of capacity. Cleaning of the tanks after decanting of the fluid is typically done by manpower, for example an individual getting into the tank to scrub and clean the tank, or the tank can be cleaned by a mechanical vibrator.

The limitations of weight, in order to comply with various road and bridge restrictions, and the additional cost involved in cleaning the tank by the use of manpower or mechanical vibrators make the transportation of liquids and liquid sludge in a typical tanker vehicle expensive and not efficient. The extendable mobile fluid carrying apparatus disclosed herein overcomes the problems and limitations of the prior art by providing a vehicle that is agile, having a high cubic feet per minute blower (high-CFM) vacuum truck that is capable of hauling 45,000 pounds of payload capacity and does not violate bridge and road weight restrictions.

SUMMARY OF THE INVENTION

There is provided an extendable mobile fluid carrying apparatus. The extendable mobile fluid apparatus includes a first frame having a first end and a second end, with the first end configured to couple to a tractor. A fluid container, having a closed end, is coupled to the first frame and configured to rotate about a pivot device disposed proximate the second end of the first frame. The container defines a closable orifice configured to decant a fluid from the container. A high-CFM blower is selectively coupled to the closed end of the container and configured to draw a vacuum. A lift mechanism is coupled to the first frame and the fluid container and configured to lift the closed end of the fluid container to an angle greater than 45° relative to the first frame. The second frame is slidingly coupled to the first frame, with the second frame configured to automatically extend away from the first frame a predetermined distance. The second frame includes a wheel set. In another embodiment, the tractor includes a power takeoff mechanism coupled to a prime mover and to the blower.

There is provided an extendable mobile fluid carrying apparatus including a tractor that includes a prime mover. A high-CFM (cubic feet per minute) blower apparatus is mounted on the tractor and is configured to draw a vacuum. A first frame having a first end and a second end is coupled to the tractor at the first end of the first frame. The fluid container having a closed end, is coupled to the first frame and configured to rotate about a pivot device disposed approximate the second end of the first frame. The container also defines a closable orifice configured to decant a fluid from the rear of the container, with the closed end of the container coupled to the blower. A lift mechanism is coupled to the first frame and the fluid container with the lift mechanism configured to lift the closed end of the fluid container to an angle greater than 45° relative to the first frame. A second frame is slidingly coupled to the first frame. The second frame is configured to automatically extend away from the first frame a predetermined distance, with the second frame including a wheel set.

There is also provided a vehicle including a support structure having a prime mover configured to provide a motor force coupled to the support structure and a steerable wheel set coupled to the support structure. A trailer, including a first frame having a first end and a second end is coupled to the support structure at the first end of the first frame. A fluid container having a closed end is coupled to the first frame and configured to rotate about a pivot device disposed proximate the second end of the first frame. The container defines a closable orifice configured to decant a fluid from the container. The fluid container is a tube having a circular interior cross-section and including a full opening, swing door pivotally coupled to the tube at the closable orifice. The door is configured to move from a closed position to an open position. A high-CFM blower is selectively coupled to the closed end of the container and configured to draw a vacuum. A power takeoff mechanism is coupled to the blower and to the prime mover. A lift mechanism is coupled to the first frame and the fluid container and is configured to lift the closed end of the fluid container to an angle greater than the 45° relative to the first frame. A second frame is slidingly coupled to the first frame, with the first frame configured to automatically extend away from the first frame a predetermined distance. The second frame includes a wheel set. In another embodiment, the angle of the fluid container relative to the first frame is at least 75°.

DESCRIPTION OF DRAWINGS

These and other advantages of the present invention are best understood with reference to the drawings, in which:

FIG. 15 is a top view of the swing door in its full open position and illustrating a circular cross section of the closable orifice of the fluid container. The swing door is provided with valve orifices configured to couple to plumbing utilized in vacuuming, by suction, fluid and sludge material from a worksite and a selectively in communication with the interior of the fluid tank of the extendable mobile fluid carrying apparatus.

FIG. 16 is an illustration of a rear or back end of a fluid container of an extendable mobile fluid carrying apparatus.

DETAILED DESCRIPTION OF EXEMPLARY EMBODIMENTS

Figure 1:
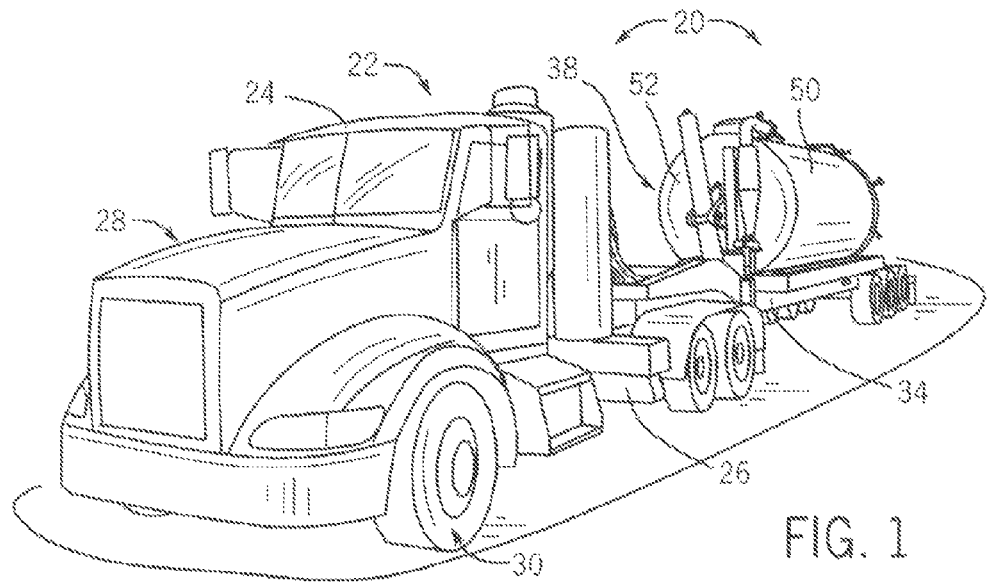
FIG. 1 is an illustration of an exemplary embodiment of an extendable mobile fluid carrying apparatus including a tractor and tanker trailer.

Referring to the Figures, there is illustrated an exemplary embodiment of an extendable mobile fluid carrying apparatus 20 includes a tractor 24 having a cab configured for driving and maneuvering the apparatus on-road and off-road conditions. Coupled to the tractor 24 is a trailer apparatus 34 which includes a first frame 36 and a slidable second frame 42. The slidable subframe allows the trailer length to be reduced approximately 32 feet when maneuvering in tight constraints at a worksite but configured to allow the sliding subframe to extend away from the first frame 36 automatically as the first frame 36 is moved forward by the tractor 24. With the sliding subframe extended, the trailer length is extended to approximately 43 feet thereby allowing the weight distribution over a longer wheel base to comply with applicable bridge and road restrictions.

A vacuum tank, approximately 82 inches in diameter and approximately 20 feet long, has a typical capacity of 5,000 gallons of fluid. The vacuum tank or fluid container 50 has a full opening swing up rear door 58 that can be opened and lowered either by the operation of gravity or by actuation by a dual action hydraulic pump and cylinder 60. The swing door 58 is coupled to the fluid container 50 with a door hinge 59. A plurality of lock devices are positioned along the perimeter of the door to fluidly seal the door 58 to the container 50. The fluid container 50 or vacuum tank is also pivotally coupled with pivot devices 51 to the first frame 36 and can be raised to at least as high as 75°, relative to the first frame 36, for purposes of off loading, by gravity, the contents of the fluid tank 50. The contents of the fluid tank 50 typically is a high viscosity sludge, vacuumed by suction, at an industrial site and hauled away for further processing. To off load the sludge, the rear swing door 58 is unlocked and opens as the fluid container 50 tank is raised. Because of the height of the tank front end 38, the sludge and fluid slides out of the tank and typically does not require cleaning by means of a mechanical vibrator or the need for a person to enter the tank to shovel or scrape the material from the tank for cleaning purposes. The exemplary embodiment of the extendable mobile fluid carrying apparatus 20 includes a high-CFM blower apparatus 80 which draws a suction through appropriate plumbing 92, vacuum coupler 86, accumulators, filters 82, and cyclone apparatus 84 to draw a vacuum through the fluid tank 50 and provide suction for gathering fluids, materials in the fluid, and liquid sludge at a worksite into the fluid tank. An example of a blower system 80 is model 616DVJ manufactured by Roots with Stoddard silencers model No. 73A625 and 73A558.

The tractor 24 typically is a Class 8 tractor such as manufactured by Peterbilt, however any appropriate tractor 24 having a sufficient prime mover 28, for example an internal combustion engine, preferably a diesel engine, can be used with the extendable mobile fluid carrying apparatus. The tractor 24 can also be provided with a power take-off (PTO) mechanism 32 coupled to the prime mover 28 with the power take-off mechanism coupled to the blower 80 to operate the blower 80 for generating a vacuum. Appropriate gear trains, for example a transmission, couples the PTO to the prime mover and the PTO to the blower.

The tractor 24 includes a support structure 26 configured to support a cab, the prime mover 28, and the power take-off mechanism 32. In one embodiment, the support structure 26 also supports the high-CFM blower 80 and related equipment. The support structure 26 also includes a steerable wheel set 30 controllable from the cab of the tractor 24. The support structure 26 also includes at least one additional wheel set 46, for example a tandem dual axle wheel set. The support structure 26 also includes a fifth wheel configured to couple to the trailer 34.

Figure 10:
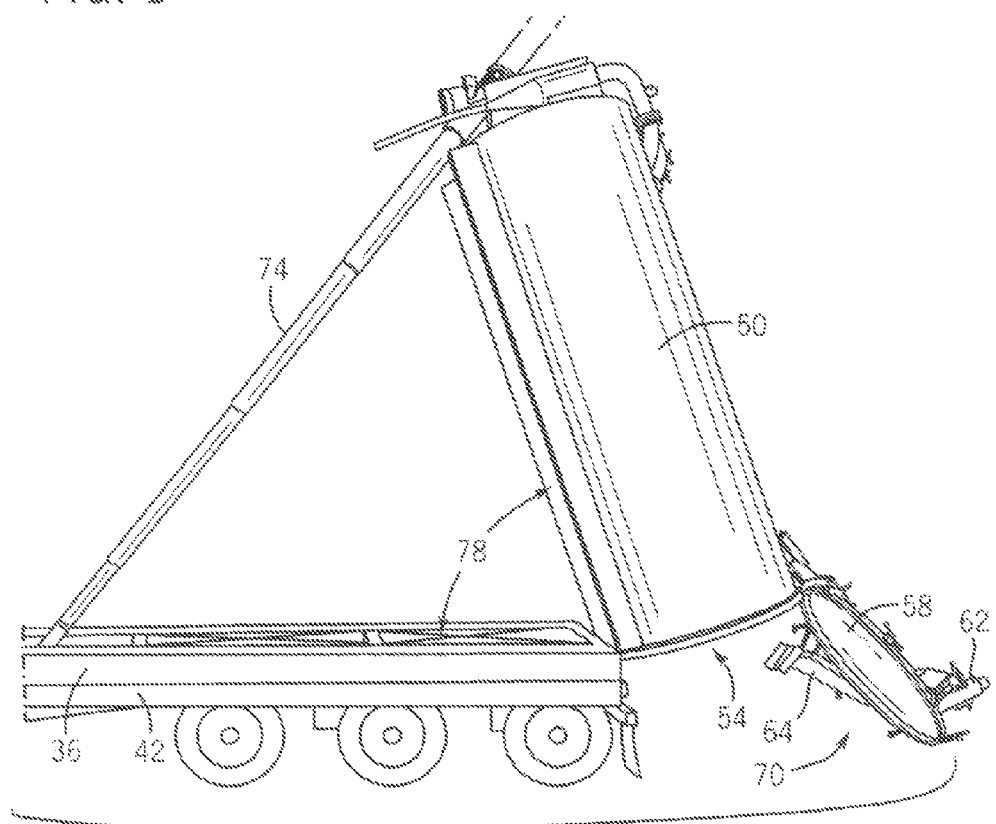
FIG. 10 is an illustration of the fluid container pivoted approximate the second end of the first frame by a hydraulic lift mechanism coupled to the first frame and the fluid container with the fluid container at an angle of 76° relative to the first frame and further illustrating the second frame position fully under the first frame of an extendable mobile fluid carrying apparatus.

The fluid container 50 can be configured as a tube having a circular interior cross-section 56 and includes a full opening, swing door 58 pivotally coupled to the tube at the closable orifice 54. The door 58 is coupled to the container 50 with a suitable hinge 59 and is configured to move from a closed position 68 to an open position 70 (See FIGS. 10, 15, and 16) in order to decant any fluid, sludge or other material contained in the fluid container 50.

An exemplary embodiment of the extendable mobile fluid carrying apparatus 20 provides a door opening movement facilitated by one of gravity and a hydraulic cylinder 60.

The swing door 58 typically defines a plurality of closable ports 62 positioned proximate the lower edge of the swing door 58 when the door is in a closed position 68. (See FIG. 16) As illustrated in FIGS. 15 and 16, there are three closable ports 62. The middle port can be used to decant fluid in the fluid container 50 without opening the swing door 58.

Figure 11:
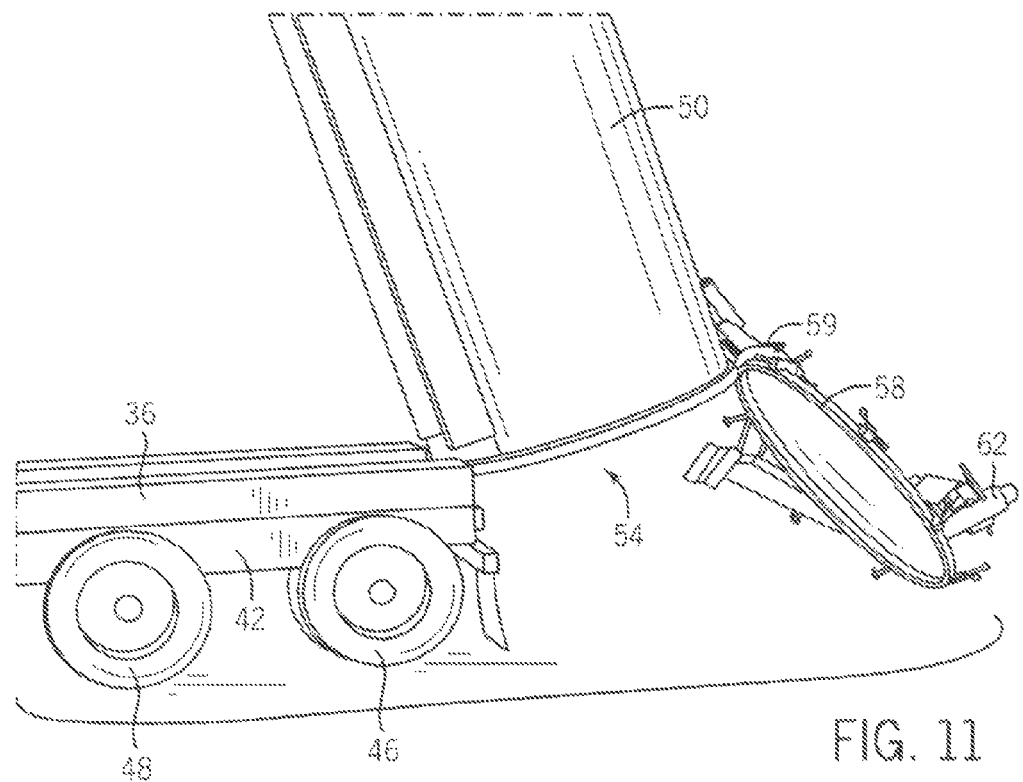
Figure 12:
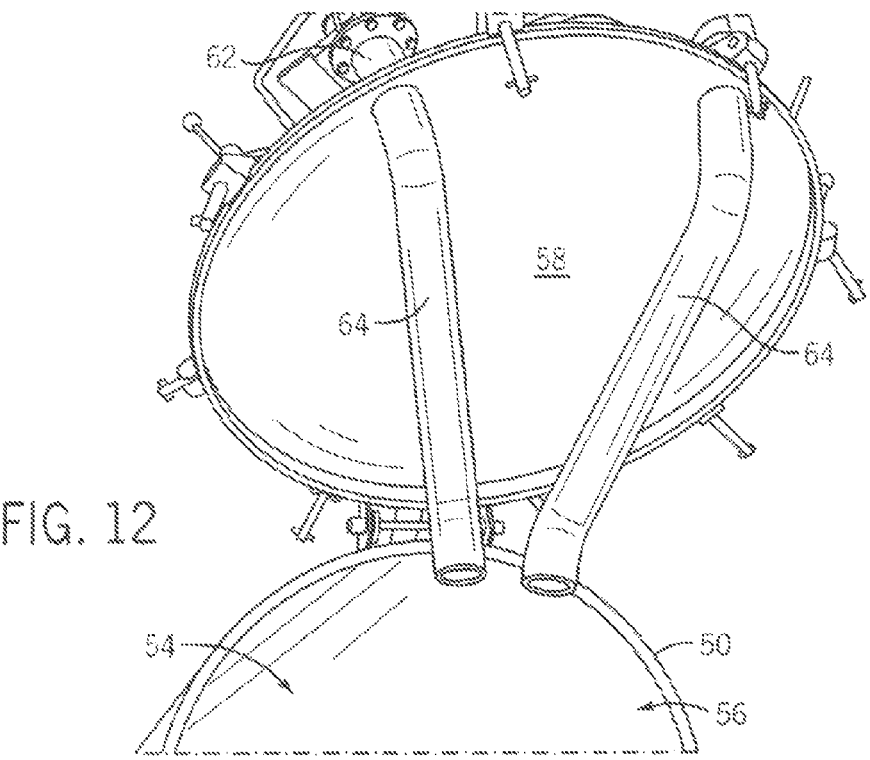
FIG. 12 is a detailed rear view of a full opening, swing door pivotally coupled to a fluid container at the closable orifice of the fluid container including plumbing associated with the fluid container of an exemplary embodiment of an extendable mobile fluid carrying apparatus.
Figure 13:
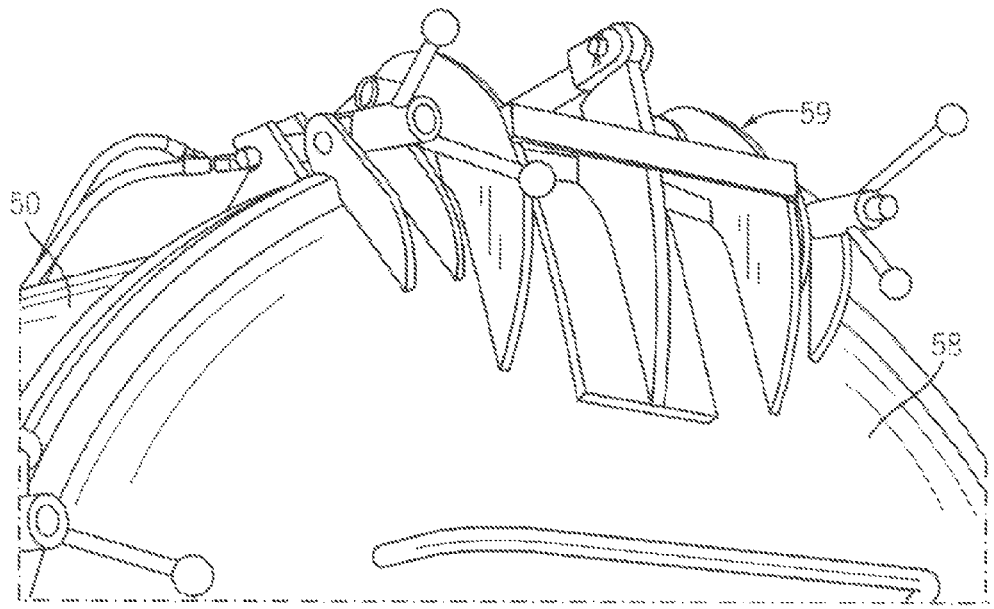
FIG. 13 is a detailed view of a hydraulic cylinder and associated apparatus configured to open and close a swing door pivotally coupled to a fluid container of an extendable mobile fluid carrying apparatus.
Figure 14:
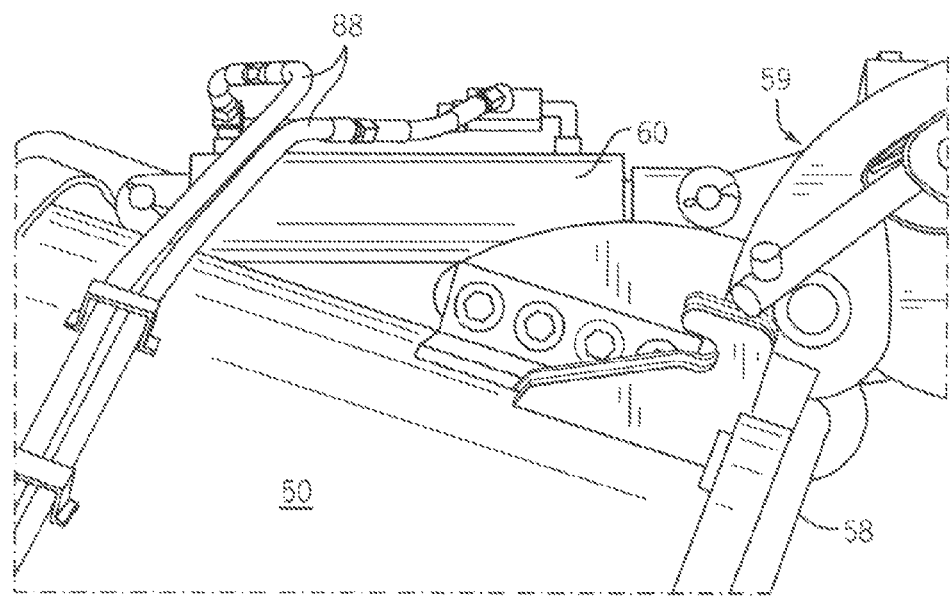
FIG. 14 is a detailed view of a two-way hydraulic cylinder coupled to the fluid container and the swing door of a fluid container.
Figure 17:
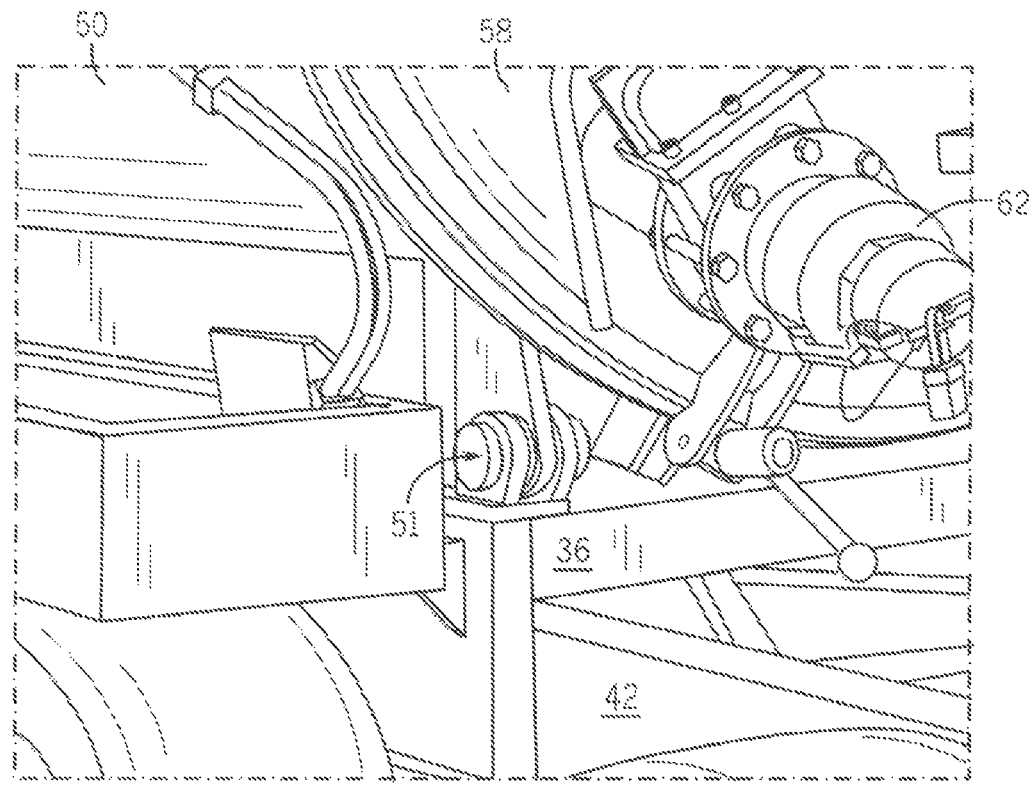
FIG. 17 is a detailed illustration of a pivot device disposed proximate the second end of the first frame to which the fluid container is coupled.
Figure 18:
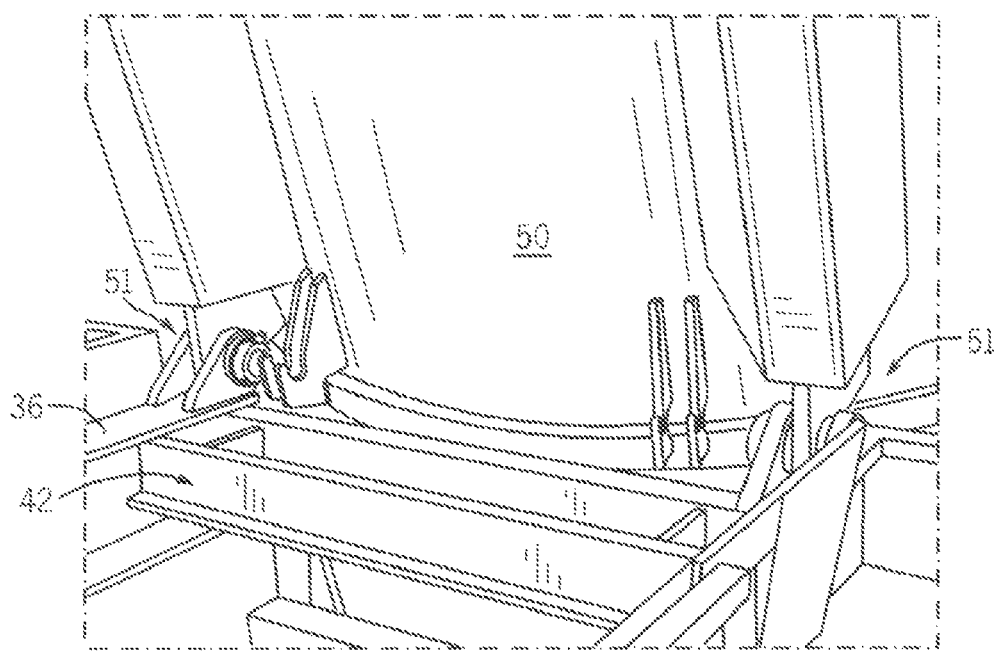
FIG. 18 is a detailed view of the pivot device which couples the fluid tank to the first frame with the fluid tank in its full upright position relative to the first frame.
Figure 19:
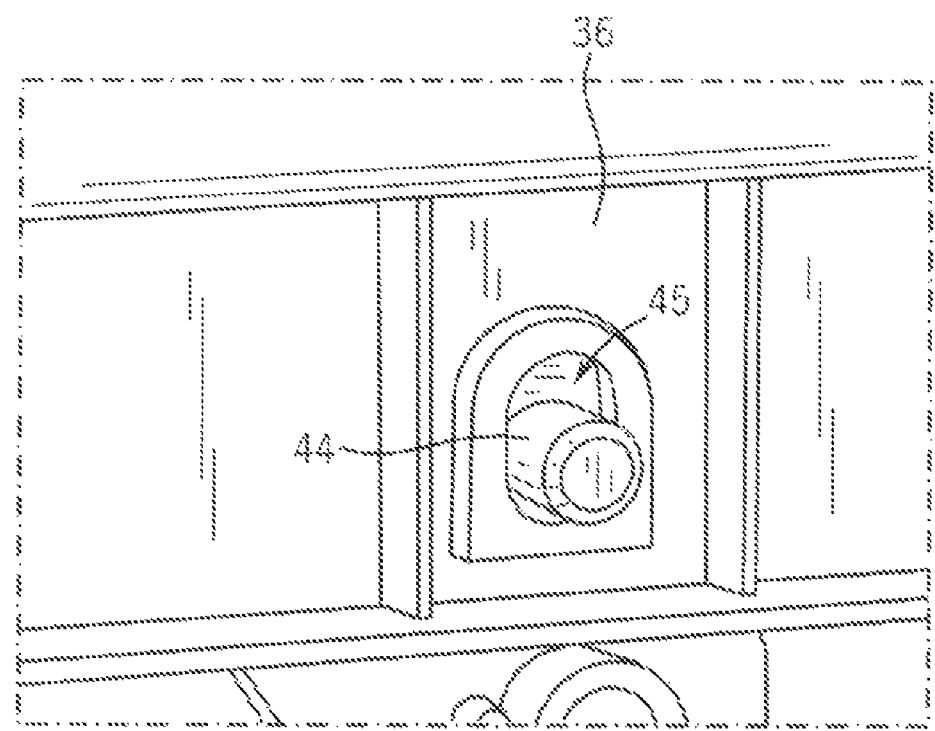
FIG. 19 is a detailed view of a lock pin configured to lock the first frame and the second frame in a selected position.

The closable ports 62 on each side of the middle port are configured to couple to hoses for drawing waste material into the fluid container 50 during a vacuum operation. Such closable ports 62 are coupled to interior channels 64. (See FIGS. 11 and 12) In operation as waste material enters the fluid container 50 through one or both of such closable ports 62, the waste material passes up through an interior channel 64 and exits into the fluid container 50. The material typically includes fluid, solid matter, and air. The fluid and solid matter drops to the bottom of the fluid tank 50 and the air, as drawn by the high-CFM blower 80, moves through the fluid container 50 to the blower plumbing 92, filter 82, and cyclone 84 and exits to atmosphere. The extendable mobile fluid carrying apparatus 20 can also include a baghouse and silencer (Muffler) mounted on the support structure 26 or the trailer 34, as determined by the user.

A further exemplary embodiment of the apparatus 20 provides a tractor 24 which includes a power take-off mechanism 32 coupled to the blower 80. The prime mover 28 transfers power to the power-take-off mechanism 32 which in turn operates the blower 80 to draw the vacuum through the fluid container 50.

The extendable mobile fluid carrying apparatus 20 can include a second wheel set 48 coupled to the second frame 42 with at least one of the wheel sets 46 being retractable.

Figure 2:
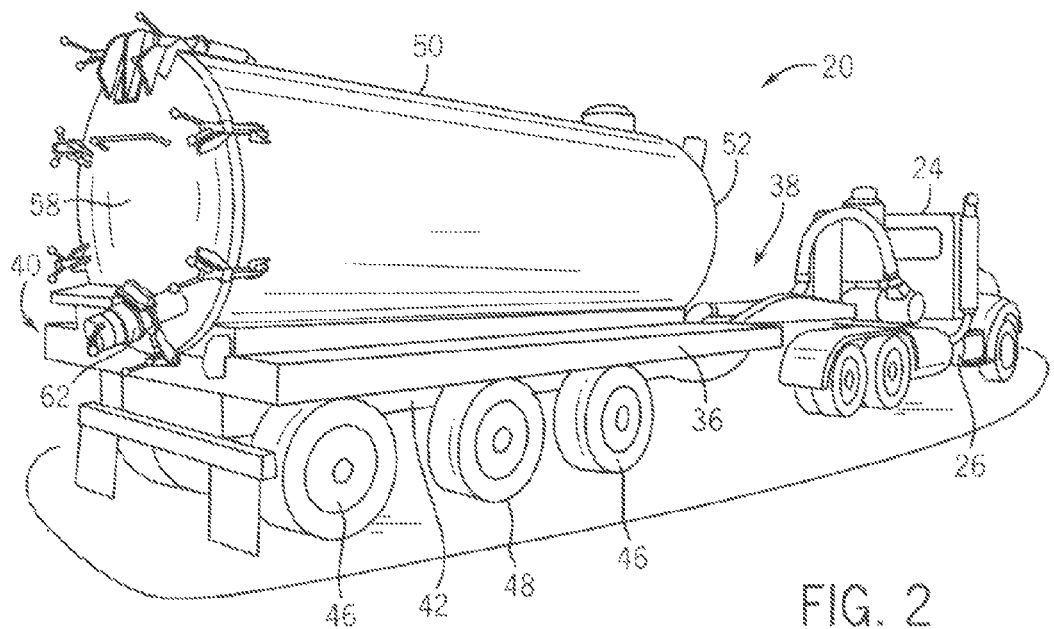
FIG. 2 is an illustration of the second frame positioned under the first frame of an exemplary embodiment of an extendable mobile fluid carrying apparatus with the tanker trailer configured for onsite maneuverability.
Figure 3:
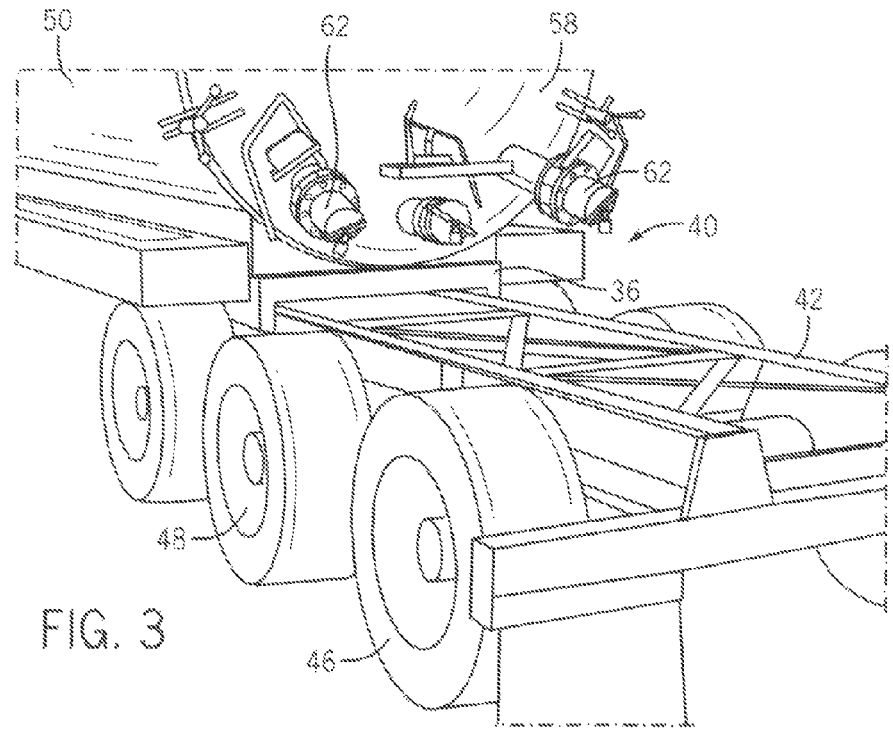
FIG. 3 is an illustration of a second frame extended from a first frame of an extendable mobile fluid carrying apparatus, with the second frame supported by three wheel sets, with one of the wheel sets retractable.
Figure 4:
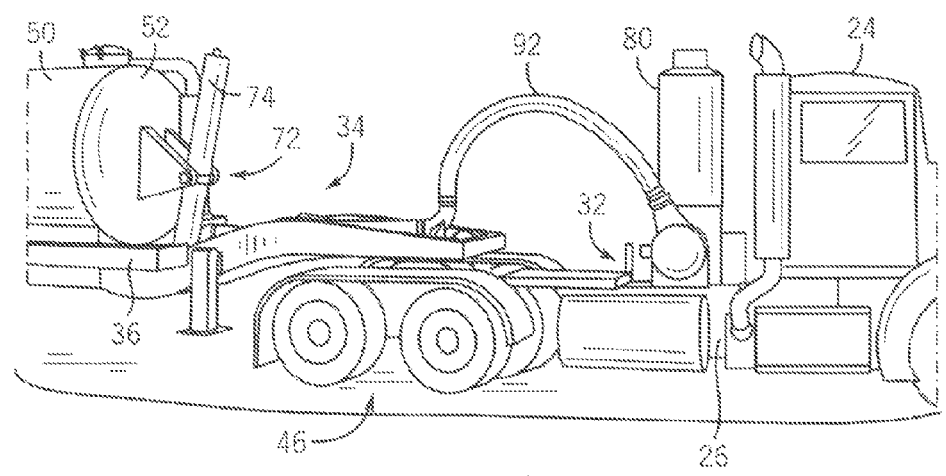
FIG. 4 is an illustration of the first frame coupled to the tractor illustrated in FIG. 2 and illustrating plumbing extending from the high-CFM blower apparatus to the fluid tank.

In operation, the extendable mobile fluid carrying apparatus 20, with the fluid container 50 empty, is transported to a work site with the second frame 42 positioned substantially completely under the first frame 36. (See FIG. 2) Through appropriate plumbing, liquid and/or liquid sludge is pumped from a work site depository into the fluid container 50 by a vacuum drawn through the fluid container 50 by a high capacity blower. A typical blower operation provides 3,800 cubic feet per minute of air movement through the system. Material being sucked up through the plumbing is deposited in the fluid container 50 with the air continuing to move through interior channels 64, one or more filters 82 and a cyclone apparatus 84 before exhausting to the atmosphere. It is anticipated that a full 5,000 gallon tank capacity, weighing approximately 45,000 pounds, can be sucked up from the worksite depository in approximately 20-30 minutes, which is an improvement over the prior art.

The extendable mobile fluid carrying apparatus 20, when it completes its pumping procedure at a worksite, can move to a second or subsequent worksite to remove waste material from that second site if there is sufficient capacity in the fluid container 50 after the first worksite operation. A limiting factor of the weight capacity of the fluid container 50 is governed by the bridge and road weight restriction requirements along a selected travel route. In a typical operation, while maneuvering at a worksite, the second frame 42 is slidingly positioned under the first frame 36 to shorten the overall length of the tractor 24 and tanker trailer 34 combination. At such time as the apparatus 20 is to move on the public highways, the second frame 42 is automatically extended to the rear of the first frame 36 by the tractor 24 pulling the first frame 36 forward thereby distributing the weight of the tanker container 50 and its contents over a longer wheel base during the trip to the site for decanting of material from the fluid container 50. The second frame 42 is also configured to support a retractable wheel set 46. The retractable wheel set 46, also referred to as a lift axle, is selectively lowered to contact the road or ground surface to facilitate axle weight distribution of the load in the fluid container 50.

A frame lock 44 is coupled to the second frame 42 and configured to engage locking orifices defined in the first frame 36. The locking orifices are positioned to lock the first and second frames 36, 42 in the retracted, nested position and in the extended position.

In an exemplary embodiment of the extendable mobile fluid carrying apparatus 20, the closed length, as measured from the front bumper to the back bumper of the subframe, is approximately 51½ feet. In its extended position, the apparatus, as measured from the front bumper to the back bumper of the subframe, is approximately 61½ feet.

The extendable mobile fluid carrying apparatus 20 is configured to lift the front closed end 52 (end closest to the tractor 24) of the fluid container 50 to an angle 78 between 45° and 80° relative to the first frame 36. Such high tilt extent of the fluid container 50, such as a tank, facilitates decanting of material such as sludge, typically which has a high viscosity, without requiring mechanical vibration or requiring personnel to enter the fluid container 50 to clean the tank. With the fluid container 50 at such a high angle, gravity alone will pull the high viscosity material, such as sludge and liquid, from the tank into an appropriate disposal container for further processing.

Figure 7:
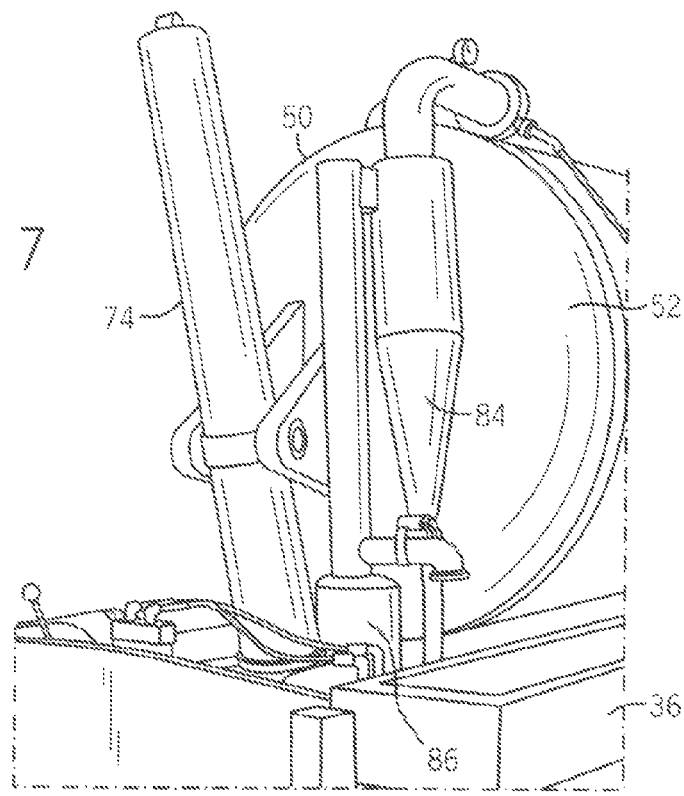
FIG. 7 is a detailed view of a front end of the fluid container of the extendable mobile fluid carrying apparatus including a hydraulic lift cylinder (left side tube) pivotally coupled to the fluid tank and plumbing for a cyclone apparatus related to the high-CFM blower apparatus illustrated in FIG. 8.
Figure 8:
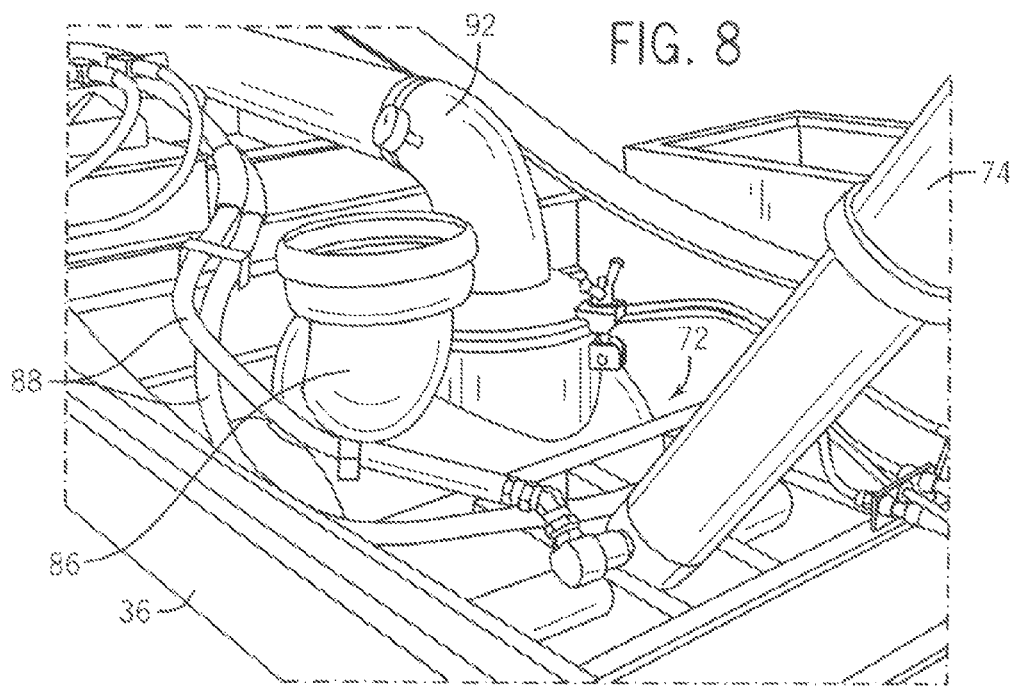
FIG. 8 is a detailed view of a portion of lift mechanism coupled to the first frame and a portion of the high-CFM blower apparatus plumbing which is decoupled from the fluid tank when the fluid tank is in its raised position.
Figure 9:
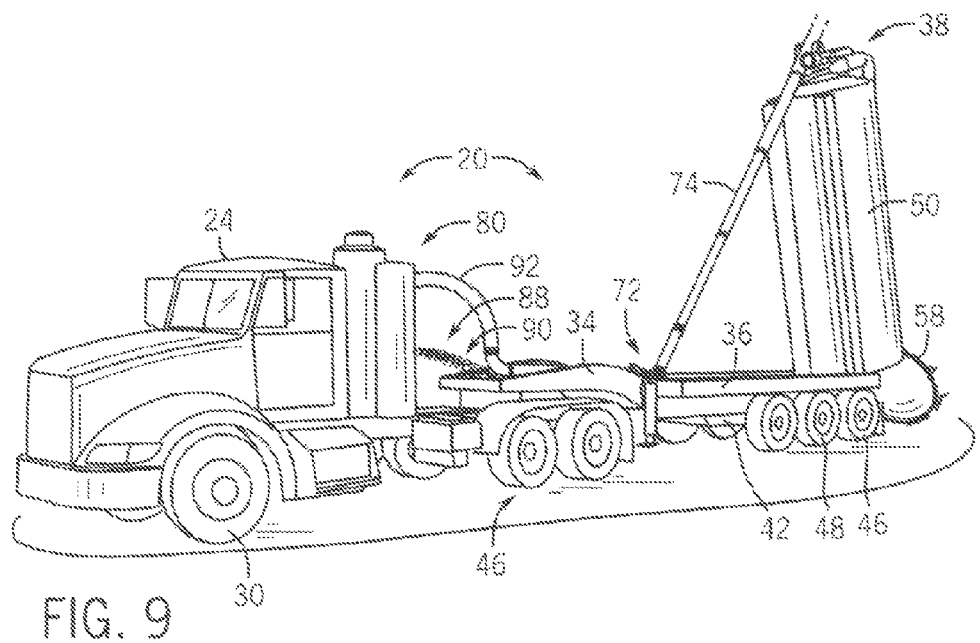
FIGS. 9 and 11 illustrate the positioning of the fluid container in its full upright position and with the swing door fully open to discharge the contents of the fluid tank.

A vacuum coupler 86 is disposed on the first frame 36 to engage blower plumbing coupled to the fluid container 50 as the fluid container is lowered to its travel configuration. An exemplary embodiment of the vacuum coupler 86 is illustrated in FIGS. 7 and 8. The female portion (FIG. 8) includes a flexible collar, for example rubber, that will fluidly seal with the male portion, (FIG. 7) during a vacuum operation. The vacuum coupler 86 will disengage as the fluid container 50 is raised to discharge the contents of the container.

The first frame 36, second frame 42, and the fluid container 50 are composed of material consisting of steel, aluminum, and a combination of steel and aluminum. Such material compositions provide for a lighter vehicle 22 which together with the extendable wheel base allows for a higher fluid tank capacity and still maintaining appropriate weight distribution to comply with applicable bridge and road weight restrictions.

The apparatus 20 of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

Figure 5:
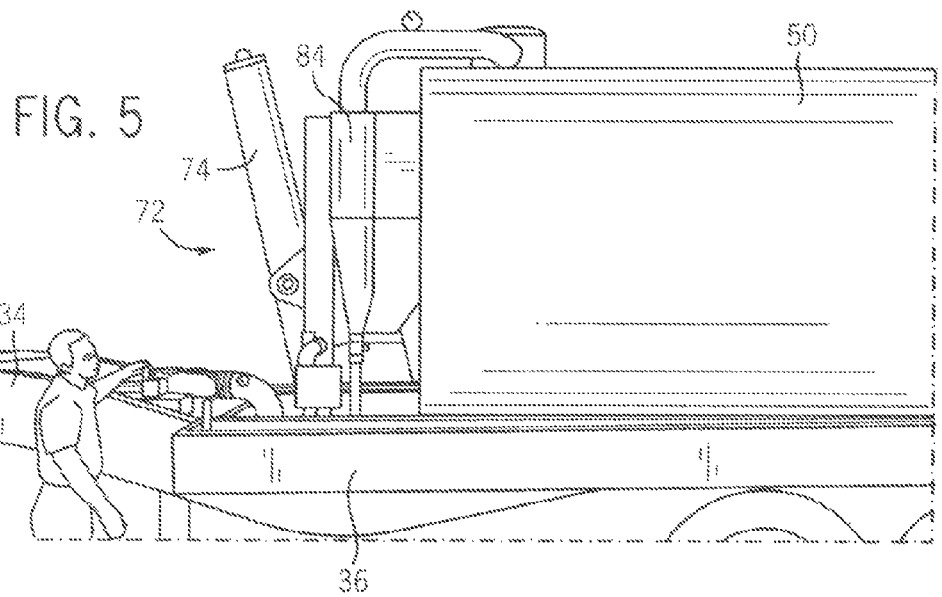
FIG. 5 is a side view of a portion of a fluid container, lift mechanism and plumbing of an extendable mobile fluid carrying apparatus.
Figure 6:
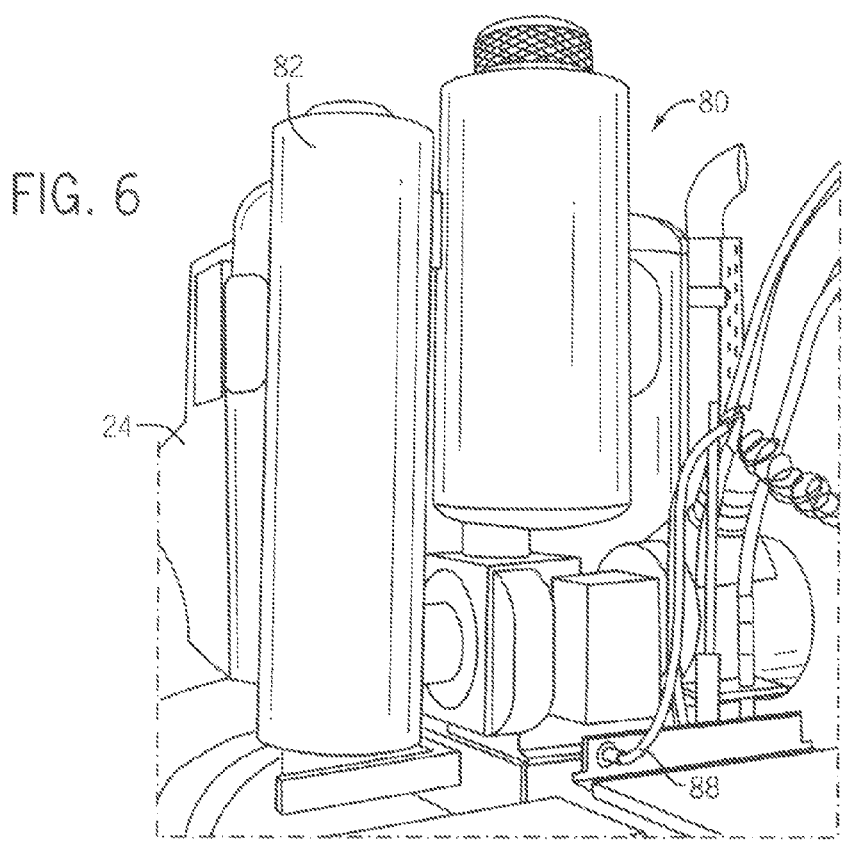
FIG. 6 is a rear view of the high-CFM blower apparatus illustrated in FIG. 1 including a blower, filter, muffler and associated plumbing.

The extendable mobile fluid carrying apparatus is configured with appropriate light weight materials suitable for the intended purposes such as steel and/or aluminum or some combination of steel and aluminum. The extendable mobile fluid carrying apparatus provides excellent maneuverability in tight customer locations and provides maximum capacity of as much as 45,000 pounds of payload, which coupled with the tear weight of the trailer 34 and tractor 24, meets the typical bridge and road restriction requirements of 80,000 pounds. The extendable mobile fluid carrying apparatus typically is also provided with hose which are retained in side mounted hose troughs in either side of the fluid container 50 and other appropriate hydraulic piping 88 to operate the various hydraulic cylinders 60 associated with the apparatus as well as appropriate pneumatic plumbing 90 and electrical conductors. Appropriate control stations to operate the apparatus 20 are positioned on the trailer 34 and the cab of the tractor 24. (See FIG. 5) It is also contemplated that the fluid container 50 is detachable from the first frame 36 to maximize its use with the different attachments, maintenance and other appropriate procedures.

For purposes of this disclosure, the term "coupled" means the mechanical joining of two components directly or indirectly to one another. Such joining may be stationary in nature or moveable in nature. Such joining may be achieved with the two components and any additional intermediate members being integrally formed as a single unitary body with one another or the two components and any such additional member being attached to one another. Such adjoining may be permanent in nature or alternatively be removable or releasable in nature.

The apparatus of the extendable mobile fluid carrying apparatus 20 is of a construction which is both durable and long lasting, and which will require little or no maintenance to be provided by the user throughout its operating lifetime. The extendable mobile fluid carrying apparatus is also of inexpensive construction to enhance its market appeal and to thereby afford it the broadest possible market. Finally, all of the aforesaid advantages and objectives are achieved without incurring any substantial relative disadvantage.

Although the foregoing description of an extendable mobile fluid carrying apparatus has been shown and described with reference to particular embodiments and applications thereof, it has been presented for purposes of illustration and description and is not intended to be exhaustive or limited to the particular embodiments and applications disclosed. It will be apparent to those having ordinary skill in the art that a number of changes, modifications, variations, or alterations to the extendable mobile fluid carrying apparatus as described herein may be made, none of which depart from the spirit or scope of the extendable mobile fluid carrying apparatus. The particular embodiments and applications were chosen and described to provide the best illustration of the principles and its practical application to thereby enable one of ordinary skill in the art to utilize the extendable mobile fluid carrying apparatus in various embodiments and with various modifications as are suited to the particular use contemplated. All such changes, modifications, variations, and alterations should therefore be seen as being within the scope of the extendable mobile fluid carrying apparatus.

What is claimed is:

1. An extendable mobile fluid carrying apparatus comprising:
    a first frame having a first end and a second end, with the first end configured to couple to a tractor;
    a fluid container having a closed end, the container pivotally coupled to the first frame and configured to rotate about a pivot device disposed proximate the second end of the first frame, with the container defining a closable orifice configured to decant a fluid from the container and with a swing door configured to selectively cover the closable orifice;
    a high-CFM blower mounted on the tractor and selectively coupled to the closed end of the container through a vacuum coupler configured to couple to the blower coupled to the fluid container, with the vacuum coupler including a male portion and a female portion, and mounted on the first frame with the blower configured to draw a vacuum, the female portion includes a flexible collar configured to fluidly seal with the male portion and disengage when the fluid container is raised;
    a lift mechanism coupled to the first frame and the fluid container and configured to lift the closed end of the fluid container to an angle not less than 45° nor more than 80° relative to the first frame to decant the fluid; and lower the closed end to a position parallel to the first frame; and
    a second frame slidingly coupled to the first frame, the second frame configured to automatically extend away from the first frame a pre-determined distance, with the second frame including a wheel set, with the first frame and second frame including the wheel set configured for one of on-road and off-road conditions.

2. The extendable mobile fluid carrying apparatus of claim 1, wherein the fluid container is a tube having a circular interior cross-section and including a full opening, swing door pivotally coupled to the tube at the closable orifice, with the door configured to move from a closed position to an open position.

3. The extendable mobile fluid carrying apparatus of claim 2, wherein the door opening movement is facilitated by one of gravity and a hydraulic cylinder.

4. The extendable mobile fluid carrying apparatus of claim 2, wherein the wheel set is retractable.

5. The extendable mobile fluid carrying apparatus of claim 1, wherein the tractor includes a power take-off mechanism coupled to a prime mover and to the blower.

6. The extendable mobile fluid carrying apparatus of claim 1, including a second wheel set coupled to the second frame.

7. The extendable mobile fluid carrying apparatus of claim 1, wherein the angle of the fluid container relative to the first frame is at least 75°.

8. The extendable mobile fluid carrying apparatus of claim 1, wherein the angle of the fluid container relative to the first frame is at least 60°.

9. The extendable mobile fluid carrying apparatus of claim 1, wherein the first frame, second frame and fluid container each are composed of material from a group consisting of steel, aluminum, and a combination of steel and aluminum.

10. The extendable mobile fluid carrying apparatus of claim 1, wherein the wheel set is retractable.

11. An extendable mobile fluid carrying apparatus comprising:
    a tractor including a prime mover;
    a high-CFM blower apparatus mounted on the tractor and configured to draw a vacuum;
    a first frame having a first end and a second end, with the first end configured to couple to the tractor;
    a fluid container having a closed end, the container coupled to the first frame and configured to rotate about a pivot device disposed proximate the second end of the first frame, with the container defining a closable orifice configured to decant a fluid from the container, with the closed end of the container selectively coupled to the blower with a vacuum coupler configured to couple to the blower coupled to the fluid container, with the vacuum coupler including a male portion and a female portion, and mounted on the first frame, the female portion includes a flexible collar configured to fluidly seal with the male portion and disengage when the fluid container is raised;
    a lift mechanism coupled to the first frame and the fluid container and configured to lift the closed end of the fluid container to an angle not less than 45° nor more than 80° relative to the first frame to decant the fluid and lower the closed end to a position parallel to the first frame; and
    a second frame slidingly coupled to automatically extend away from the first frame a pre-determined distance, with the second frame including a wheel set, with the tractor, first frame and second frame including the wheel set configured for one of on-road and off-road conditions.

12. The extendable mobile fluid carrying apparatus of claim 11, wherein the fluid container is a tube having a circular interior cross-section and including a full opening, swing door pivotally coupled to the tube at the closable orifice, with the door configured to move from a closed position to an open position.

13. The extendable mobile fluid carrying apparatus of claim 12, wherein the door opening movement is facilitated by one of gravity and a hydraulic cylinder.

14. The extendable mobile fluid carrying apparatus of claim 11, wherein the tractor includes a power take-off mechanism coupled to the blower.

15. The extendable mobile fluid carrying apparatus of claim 11, including a second wheel set coupled to the second frame.

16. The extendable mobile fluid carrying apparatus of claim 11, wherein the angle of the fluid container relative to the first frame is at least 75°.

17. The extendable mobile fluid carrying apparatus of claim 11, wherein the first frame, second frame and fluid container each are composed of material from a group consisting of steel, aluminum, and a combination of steel and aluminum.

18. A vehicle comprising:
- a support structure including a prime mover configured to provide a motive force coupled to the support structure and a steerable wheel set coupled to the support structure;
- a trailer including a first frame having a first end and a second end, with the first end configured to couple to the support structure;
- a fluid container having a closed end, the container pivotally coupled to the first frame and configured to rotate about a pivot device disposed proximate the second end of the first frame, with the container defining a closable orifice configured to decant a fluid from the container, the fluid container is a tube having a circular interior cross-section and including a full opening, swing door pivotally coupled to the tube at the closable orifice, with the door configured to move from a closed position to an open position;
- a high-CFM blower mounted on the support structure selectively coupled to the closed end of the container and configured to draw a vacuum and selectively couple to the container with a vacuum coupler configured to couple to the blower coupled to the fluid container, with the vacuum coupler including a male portion and a female portion, and mounted on the first frame of the trailer, the female portion includes a flexible collar configured to fluidly seal with the male portion and disengage when the fluid container is raised;
- a power take-off mechanism coupled to the blower and the prime mover;
- a lift mechanism coupled to the first frame and the fluid container and configured to lift the closed end of the fluid container to an angle not less than 45° nor more than 80° relative to the first frame to decant the fluid and lower the closed end to a position parallel to the first frame; and
- a second frame slidingly coupled to the first frame, the second frame configured to automatically extend away from the first frame a pre-determined distance, with the second frame including a wheel set, with the support structure, first frame and second frame including the wheel set configured for one of on-road and off-road conditions.

19. The vehicle of claim 18, wherein the angle of the fluid container relative to the first frame is at least 75°.

* * * * *